US006889240B2

(12) United States Patent
Kiuchi et al.

(10) Patent No.: US 6,889,240 B2
(45) Date of Patent: *May 3, 2005

(54) DATA PROCESSING DEVICE HAVING A CENTRAL PROCESSING UNIT AND DIGITAL SIGNAL PROCESSING UNIT

(75) Inventors: Atsushi Kiuchi, Kokubunji (JP); Yuji Hatano, Kokubunji (JP); Toru Baji, Inagi (JP); Koki Noguchi, Tokyo (JP); Yasushi Akao, Kokubunji (JP); Shiro Baba, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/694,771

(22) Filed: Oct. 29, 2003

(65) Prior Publication Data

US 2004/0083250 A1 Apr. 29, 2004

Related U.S. Application Data

(60) Continuation of application No. 09/973,734, filed on Oct. 11, 2001, now Pat. No. 6,668,266, which is a continuation of application No. 09/213,260, filed on Dec. 17, 1998, now abandoned, which is a division of application No. 08/725,481, filed on Oct. 4, 1996, now Pat. No. 5,884,092.

(30) Foreign Application Priority Data

Oct. 9, 1995 (JP) .............................................. 7-261180
Sep. 6, 1996 (JP) .............................................. 8-236140

(51) Int. Cl.[7] .................................................. G06F 7/38
(52) U.S. Cl. ...................................... 708/490; 708/524
(58) Field of Search ............................... 708/490, 521, 708/523, 524; 712/34, 35, 36

(56) References Cited

U.S. PATENT DOCUMENTS

| 4,841,468 A | 6/1989 | Miller et al. |
| 4,912,636 A | 3/1990 | Magar et al. |
| 5,363,322 A | 11/1994 | Gergen et al. |
| 5,379,394 A | 1/1995 | Goto |
| 5,410,657 A | 4/1995 | Olson et al. |
| 5,507,000 A | 4/1996 | Stewart et al. |
| 5,521,856 A | 5/1996 | Shiraishi |
| 5,537,601 A | 7/1996 | Kimura et al. |
| 5,579,253 A | 11/1996 | Lee et al. |
| 5,588,118 A | 12/1996 | Mandava et al. |
| 5,590,357 A | 12/1996 | Intrater et al. |
| 5,630,153 A | 5/1997 | Intrater et al. |
| 5,832,248 A * | 11/1998 | Kishi et al. .................. 712/200 |
| 5,884,092 A | 3/1999 | Kiuchi et al. |

FOREIGN PATENT DOCUMENTS

JP          04-177461          11/1990

OTHER PUBLICATIONS

Nikkei Electronics, Nov. 23, 1992. No. 568, "SH Series Incorporating DSP Function", Kawasaki et al, pp. 99–112, and English translation.

* cited by examiner

*Primary Examiner*—Chuong Dinh Ngo
(74) *Attorney, Agent, or Firm*—Mattingly, Stanger & Malur, P.C.

(57) ABSTRACT

In microcomputers and digital signal processors in which a central processing unit for controlling the entire system and a digital signal processing unit having a product sum function required to process digital signals efficiently are mounted on one and the same chip, an increase in the number of processing steps caused by differing types of data handled by the calculators is prevented, thereby enhancing the efficiency of the digital signal processing.

6 Claims, 7 Drawing Sheets

FIG. 6

| | 305a | 305b | 305c | 305d | 305e | 306a | 306b | 306c |
|---|---|---|---|---|---|---|---|---|
| LOADING LONG WORD | 1 | 0 | 0 | 0 | 0 | 1 | 0 | 0 |
| STORING LONG WORD | 0 | 1 | 0 | 0 | 0 | 0 | 1 | 0 |
| INTEGER DATA — LOADING WORD | 0 | 0 | 0 | 0 | 1 | 1 | 0 | 0 |
| INTEGER DATA — STORING WORD | 0 | 0 | 1 | 0 | 0 | 0 | 1 | 0 |
| FIXED-POINT DATA — LOADING WORD | 0 | 0 | 0 | 1 | 0 | 0 | 0 | 1 |
| FIXED-POINT DATA — STORING WORD | 0 | 0 | 0 | 0 | 0 | 0 | 0 | 0 |

DATA PROCESSING DEVICE HAVING A CENTRAL PROCESSING UNIT AND DIGITAL SIGNAL PROCESSING UNIT

This is a continuation application of U.S. Ser. No. 09/973,734 filed Oct. 11, 2001, now U.S. Pat. No. 6,668,266 which is a continuation application of U.S. Ser. No. 09/213,260, filed Dec. 17, 1998 (abandoned), which is a divisional application of U.S. Ser. No. 08/725,481 filed Oct. 4, 1996, now U.S. Pat. No. 5,884,092.

BACKGROUND OF THE INVENTION

The present invention relates to a semiconductor large-scale integrated circuit having a central processing unit (CPU) and a digital signal processing unit, and more specifically to a technology suitably applied to data processing devices, such as microcomputers and digital signal processors, that require high calculation speeds.

An example of a microcomputer, which has mounted on a single chip the central processing unit (CPU) for controlling an entire system and the digital signal processing unit (digital signal processor (DSP)) having a product sum function required for efficient processing of digital signals, is found in "SH Series Incorporating DSP Function" by Kawasaki, et al., Nikkei Electronics, Nov. 23, 1992 issue, no. 568, pp. 99–112.

According to this literature, the digital signal processing unit having the product sum function is able to execute representative calculations of digital signal processing, such as digital filtering, efficiently in a small number of steps.

SUMMARY OF THE INVENTION

The conventional digital signal processing unit described in the above literature, though it has a product sum calculator, handles data to be calculated as integer data as in the central processing unit. Data handled in the world of digital signal processing are generally fixed-point or floating-point data. The floating-point data has a data format consisting of mantissa data and exponent data and is totally different from integer data, whereas the fixed-point data looks very similar to integer data except that the binary point position is different. Actually, the adding and subtracting calculation on the fixed-point data performs basically the same processing as the integer data.

Multiplication, however, uses lower-order words of specified registers as source data in the case of integer data but, in the case of the fixed-point data, uses higher-order words of specified registers, as shown in FIG. 1(a). This is because a part of data closer to the binary point is more important and, as shown in FIG. 1(b), the integer data is regarded to have the binary point to the right of the least significant bit whereas the fixed-point data normally has the point immediately to the right of the most significant bit. Hence, for an integer multiplier to carry out fixed-point multiplication, the source data needs to be shifted from the higher-order side to the lower-order side beforehand. Further, as shown in FIG. 1(c), digit aligning is performed based on the binary point position, producing a one-bit position difference between the integer data and the fixed-point data. This requires the actual program to perform shift processing to correct the bit positional difference.

There is another problem. When data read out from memory or calculation results are stored in memory or output to external devices, the digital signal processing often allows the bit length of such data to have a lower bit precision than during calculation. Hence, the actual digital signal processing unit generally performs data transfer to and from memory or external circuits in single precision words (for example, 16-bit words) and calculations in double precision words (for example, 32-bit words). When transferring data whose bit length is shorter than these calculation precisions, the operations performed on integer data and on fixed-point data greatly differ.

When transferring word data and byte data (8 bits long) whose bit length is short, the calculator dedicated to handling integer data inputs and outputs the lower-order side of a register that stores data. However, the calculator dedicated to handling fixed-point data inputs and outputs the higher-order side of the data. This difference is caused by the differing positions of the binary point. That is, when the bit length of the data to be transferred is shorter than the bit length of the operand to be stored, a part of the data closer to the binary point is more important from the standpoint of data precision and range. This binary point is assumed to be located to the right of the least significant bit in integer data whereas the binary point in fixed-point data is usually located immediately to the right of the most significant bit. This causes the above-mentioned difference in the data handling. As a result, a problem arises that the shift processing must be done each time a calculator designed to handle integer data transfers data whose bit length is shorter than the calculation precision.

If the bit length of data during transfer is set equal to the bit length of data during calculation, no such problem will occur. But transfer of redundant bits raises a problem of requiring an additional bus width and an additional memory capacity for storing data.

An object of the present invention is to provide a data processing device, such as a microcomputer and a digital signal processor, incorporating a central processing unit and a digital signal processing unit that processes fixed-point data.

Another object of the present invention is to prevent the number of processing steps from being increased by the difference in the type of data handled by the calculator and thereby enhance the efficiency of the digital signal processing in the microcomputer and the digital signal processor, which have mounted on a single chip a central processing unit for controlling the whole system and a digital signal processing unit having a product sum function for efficiently processing digital signals.

A further object of the present invention is to eliminate additional shift operations required by the correction of bit positions of multiplication results and by the data transfer, thereby increasing the speed of the digital signal processing.

These and other objects and novel features of the present invention will become apparent from the following description in this specification and the accompanying drawings.

Representative aspects of this invention may be briefly summarized as follows.

(a) The data processing device (1) has mounted on a single semiconductor substrate a CPU (100) and a digital signal processing unit (104) whose operation is controlled by the CPU (100) decoding instructions. The digital signal processing unit (104) has an addition/subtraction circuit (105) for fixed-point data and a multiplier (106) for fixed-point data.

(b) The data processing device (1) has a first processing unit (100) and a second processing unit (104), the first processing unit including a first register (103) and first calculators (101, 102) for performing operations on data contained in the first register (103), the second processing unit including a second register (108) and second calculators. (105, 106) for performing operations on data contained in the second register (108). The first processing unit (100) processes integer data and the second processing unit (104) processes fixed-point data.

(c) The digital signal processing unit (104) has a register (108) and calculators (105, 106) for processing data in the register (108). When performing a first instruction for transferring data whose bit length is shorter than the bit length of the register (108) from outside the data processing device to the register (108), the data processing device (104) takes and justifies data to the higher-order side of the register (108) and setting zeros at the redundant lower-order side of the register (108). When performing a second instruction for transferring data whose bit length is shorter than the bit length of the register (108) from the register (108) to the outside of the data processing unit (104), the data processing unit (104) outputs a required bit length of data beginning with the higher-order side of the register (108).

(d) The data processing device (1) has a central processing unit (100) including a calculation circuit (101) that performs arithmetic operation or logic operation; first, second and third address buses (109, 110, 111) to which addresses are selectively transferred from the central processing unit (100); a first memory (115) connected to the first address bus (109) and the second address bus (110) and accessed through an address from the central processing unit (100); a second memory (116) connected to the first address bus (109) and the third address bus (111) and accessed through an address from the central processing unit (100); a first data bus (112) connected to the first and second memories (115, 116) and the central processing unit (100) to transfer data; a second data bus (113) connected to the first memory (115) to transfer data; a third data bus (114) connected to the second memory (116) to transfer data; and a digital signal processing unit (104) connected to the first, second and third data buses (112, 113, 114) and adapted to operate in synchronism with the central processing unit (100). The digital signal processing unit (104) has an addition/subtraction circuit (105) for processing fixed-point data and a multiplier (106) for processing fixed-point data.

(e) The data processing device includes a multiplier (106) for which takes in a multiplier and a multiplicand and outputs the result of multiplication of the multiplier and the multiplicand and a shifter (107) that shifts the output of the multiplier. When performing a multiplication operation on integer data, the shifter outputs the output of the multiplier without shifting it. When performing a multiplication operation on fixed-point data, the shifter shifts left the output of the multiplier one bit and sets zero at the least significant bit.

That is, in data transfer between the digital signal processing unit and memories or external circuits, when data whose bit length is shorter than the calculation precision is transferred, the digital signal processing unit is provided with a function to input and output data to and from the higher-order side of the data storage register and a separate data transfer instruction for fixed-point data is provided in addition to the conventional transfer instruction for integer data.

When a fixed-point data transfer instruction is issued and the data received has a shorter bit length than a destination register, it is stored justified to the higher-order side of the destination register, with the lower bits cleared. On the contrary, when data is to be output from a source register, a required number of bits beginning with the highest order of the source register are output. As a result, no additional shift operation needs to be performed.

In microcomputers and digital signal processors—in which a central processing unit for controlling the entire system and a digital signal processing unit having a product sum function required to process digital signals efficiently are mounted on a single chip—the digital signal processing unit is made a calculation unit to handle fixed-point data and an instruction calling for execution of operation on fixed-point data is provided apart from the conventional integer calculation instruction.

That is, when a fixed-point data multiplication instruction is issued, the calculation unit to perform multiplication has the register output the source data from the higher order side, shifts left the output of the conventional integer data multiplier by one bit and stores it in a specified destination register.

BRIEF DESCRIPTION OF THE DRAWINGS

FIG. 6 is a table showing the relation between control signals 305, 306 and data to be handled.

DETAILED DESCRIPTION OF THE PREFERRED EMBODIMENTS

<<Overall Configuration>>

Figure 1A:
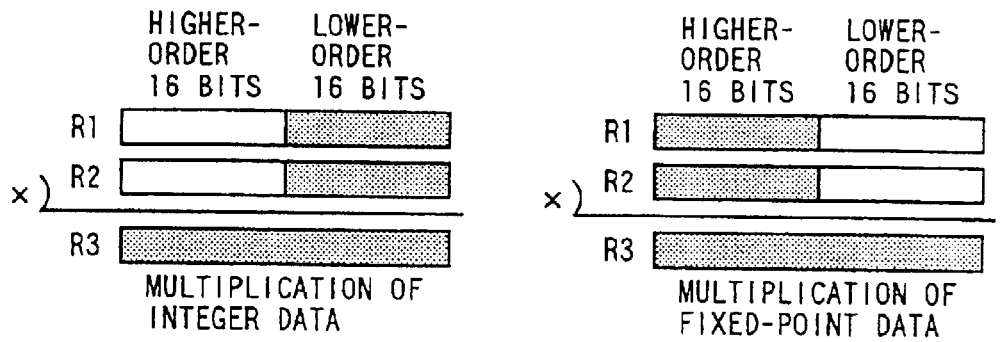
FIG. 1 is a diagram showing the relation between integer data and fixed-point data.
Figure 1B:
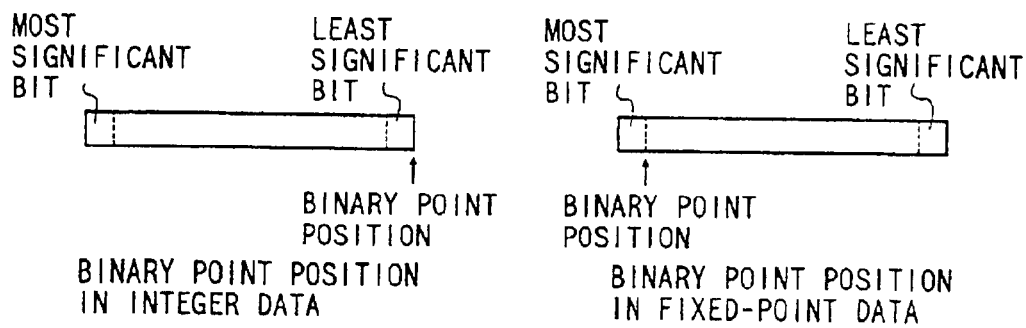
Figure 1C:
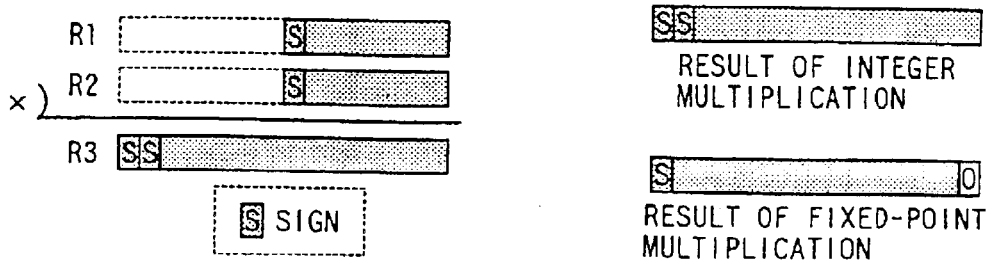
Figure 2:
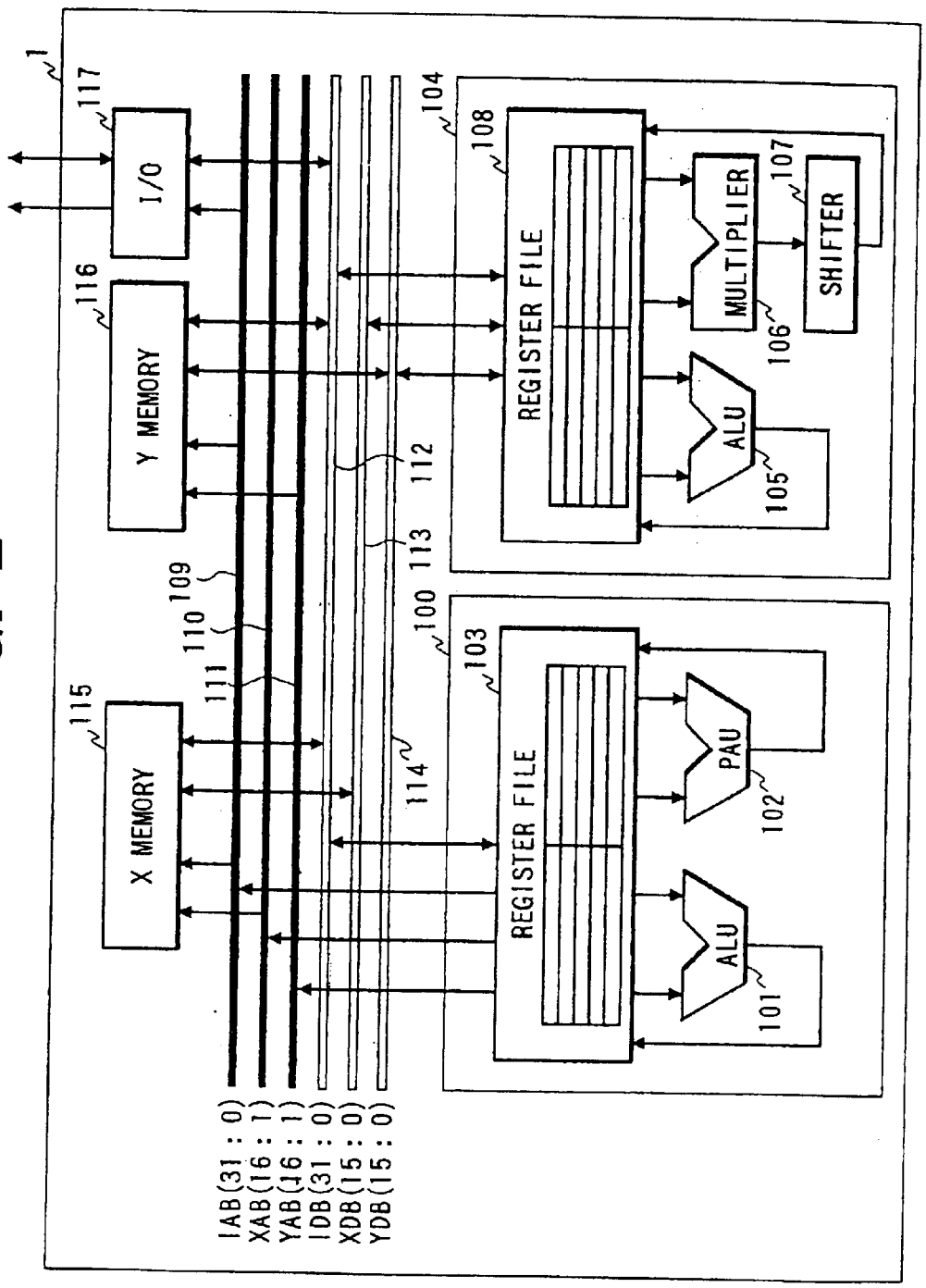
FIG. 2 is an overall block diagram of a microcomputer as one embodiment of this invention.

FIG. 2 is an overall block diagram of a microcomputer as one embodiment of the present invention. A microcomputer 1 shown in the figure is formed on a single semiconductor substrate, such as a single crystal silicon, by the semiconductor integrated circuit manufacturing technology. In the figure, reference numeral 100 represents a central processing unit (CPU) having an integer calculation function; 101 an arithmetic and logic calculator (ALU) in the central processing unit; 102 an integer calculator (PAU) in the central processing unit that performs calculation on the second address; 103 a register file that forms a source or destination operand for the above calculators; 104 a digital signal processing unit (DSP) having a fixed-point data calculation function; 105 an arithmetic and logic calculator (ALU) in the digital signal processing unit; 106 a multiplier in the digital signal processing unit; 107 a shifter; 108 a register file that forms a source or destination operand for the above calculators; 109 a 32-bit address bus (IAB[31:0]) that supports all the address space; 110 and 111 16-bit address buses (XAB[16:1], YAB[16:1]) dedicated for accessing 16-bit word data and adapted to support only a part of the address space; 112 a 32-bit data bus (IDB [31:0]); 113, 114 16-bit data buses (XDB[15:0], YDB[15:0]); 115, 116 on-chip memories (X memory, Y memory); and 117 an interface module (I/O) that offers interface with peripheral and external circuits. Other constitutional circuits that are necessarily included in this data processing device, such as peripheral circuits, an instruction decoding circuit and a flow control circuit, are not directly related to this invention and are thus excluded here from the description. Details of the microcomputer 1 are given in the U.S. patent application Ser. No. 08/630,320 filed on Apr. 10, 1996. This is cited as part of our description.

First, the basic operation and function of this embodiment are explained. The microcomputer 1 supports two kinds of instruction-a CPU instruction and a DSP instruction. The CPU instruction is an instruction executed only by the central processing unit (CPU) 100 without activating the digital signal processing unit (DSP) 104. The DSP instruction is an instruction executed by the DSP 104 with the CPU 100 shouldering a part of the processing. The DSP instruction includes an integer calculation instruction and a fixed-point data handling instruction.

The CPU 100 fetches an instruction from the on-chip memory 115, the on-chip memory 116 or an external memory not shown, and decodes it to see if it is a CPU instruction or a DSP instruction. If the decoding decides that the instruction fetched is a DSP instruction, the CPU 100 supplies DSP control signals to the DSP 104. The DSP 104 decodes the DSP control signals and generates control signals inside the DSP 104. That is, different control signals are generated for the integer calculation instruction and for the fixed-point data handling instruction.

The central processing unit 100 has basic functions of ordinary CPU, a core of common one-chip microcomputers. The arithmetic and logic calculator (ALU) 101 performs calculation on data and address. The integer calculator 102 for performing a second address calculation is a calculator that, along with the arithmetic and logic calculator 101, generates an address when the digital signal processing unit 104 needs to read out a plurality of source data from memory for product sum calculation. The source operand data required by the calculators 101, 102 are selected and supplied from the register file 103. The calculation results are stored in the selected destination register in the register file 103.

The address generated by the central processing unit 100 is output on the address bus 109, 110 or 111. The address bus (IAB) 109 supports all the address space and accesses peripheral circuits and external address spaces via on-chip memories 115, 116 and interface module (I/O) 117. The data in the address area accessed by the address bus 109 is written or read via the data bus (IDB) 112. The address bus (XAB) 110 accesses only the on-chip memory (X memory) 115. The data in the address area accessed by the address bus 110 is written or read via the data bus 113. The address bus (YAB) 111 accesses only the on-chip memory (Y memory) 116. The data in the address area accessed by the address bus 111 is written or read via the data bus (YDB) 114.

The digital signal processing unit 104 has a function of processing fixed-point data. Having the function of processing integer data does not prevent implementation of this invention. The arithmetic and logic calculator 105 performs addition/subtraction and logic operations. The multiplier 106 multiplies two 16-bit word data and outputs a 32-bit result. In the case of the integer multiplication, the multiplier takes in the lower-order word of the source register (from 0th bit to 15th bit) as the source data. In the case of fixed-point multiplication, the multiplier 106 inputs the higher-order word of the source register (from 16th bit to 31st bit) as the source data. Because it is obvious that using a product sum calculator as the calculator 106 does not prevent implementation of this invention, the following explanation takes the multiplier as an example case. The shifter 107 has a function of shifting left the output of the multiplier 106 by one bit. The source operand data required by the calculators 105, 106 are selected and supplied from the register file 108. The source operand data may be supplied from the on-chip memories 115, 116 or an external memory via the interface module 117. The result of calculation is stored in the selected destination register in the register file 108.

Data to be processed by the digital signal processing unit 104 is supplied to the register file 108 from the on-chip memories 115, 116 through the data bus 112, or from the peripheral circuits and the external circuits via the interface module 117. The processed data is output from the register file 108 to the on-chip memories 115, 116 through the data buses 112, 113, 114 or to peripheral circuits and external circuits through the interface module 117. While the data to be processed by the digital signal processing unit 104 can be transferred through the data buses 113 and 114, the data transfer via the data bus 113 can be done only between the register file 108 and the on-chip memory 115. The data transfer via the data bus 114 can only be done between the register file 108 and the on-chip memory 116. Data transfers using the data buses 113 and 114 can be performed in parallel because the resources are completely separate. When the data transfer between the register file 108 and others is executed, the required addresses are generated by the central processing unit 100.

The on-chip memories 115 and 116 are mapped at separate addresses. The kind of memory is not limited and may include random access memories (RAM) such as static RAM (SRAM) and dynamic RAM (DRAM), or read only memories (ROM) such as mask ROM and flash memory. In other words, it may be either volatile memory or non-volatile memory. The on-chip memory 115 receives addresses from the address buses 109 and 110 and, in response to these addresses, writes or reads data through the data buses 112, and 113. The on-chip memory 116 receives addresses from the address buses 109 and 110 and, in response to these addresses, writes or reads data through the data buses 112, and 114. As a result, the data write and read operations can be done in parallel in the same operation cycle.

<<Configuration of the Shifter>>

Figure 3:
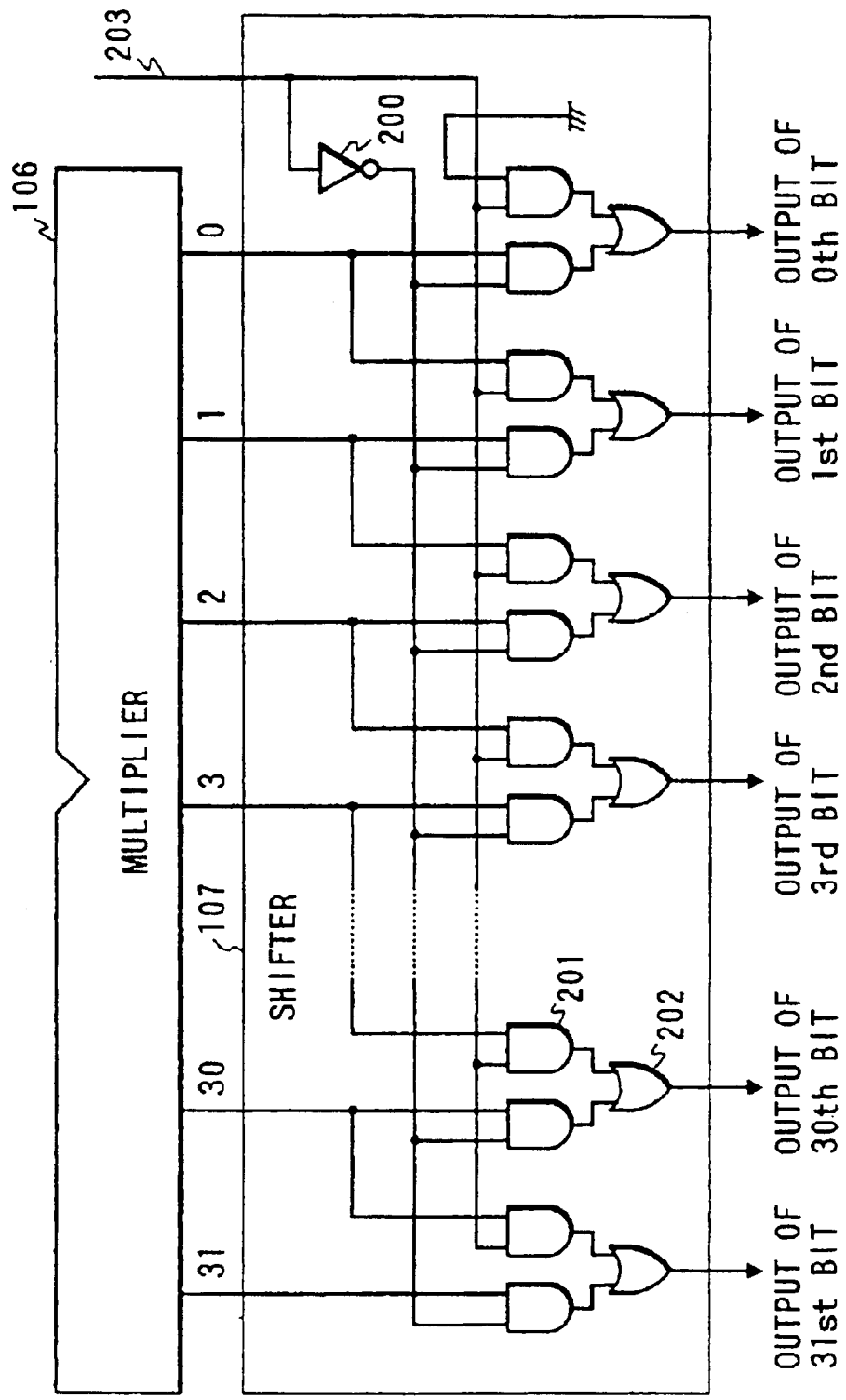
FIG. 3 is a schematic showing the detail of a shifter 107 in the first embodiment of this invention.

An example configuration of the shifter 107 is detailed in FIG. 3. In the figure, designated 200 is an inverter, 201 a logic AND circuit, 202 a logic OR circuit, and 203 a control signal to determine whether or not to perform a shift operation by the shifter 107. One OR circuit 202 and two AND circuits 201 constitute a selection circuit. The figure attached to the output of the multiplier 106 represents a bit position. A thirty first bit is the most significant bit and a 0th bit is the least significant bit. Other signals are the same as those of FIG. 2. This embodiment of the shifter represents a case where the data processing device supports both the integer multiplication and the fixed-point multiplication. The multiplier 106 always performs the integer multiplication. As a result, when the integer multiplication instruction is executed, the control signal 203 goes low causing the calculation result of the multiplier 106 to be output as it is. When the fixed-point multiplication instruction is executed, the control signal 203 goes high causing the calculation result of the multiplier 106 to be shifted left by one bit before being output. For the zero-th bit, a logic zero is output. In this way, the fixed-point multiplication is realized. When the integer multiplication instruction is not supported, the shifter 107 does not need the through function and needs only to shift one bit at all times, making the control signal 203 unnecessary. In that case, the shift function itself is actually not necessary and the only requirement is to make connection so that the bit position at the destination storage is shifted left by one bit. Hence, having a shift circuit such as 107 is not a necessary condition of this invention. Rather, the essential point of this invention is that the digital signal processing unit 104 have at least the fixed-point multiplication function.

Both the fixed-point multiplication and the integer multiplication can be executed by providing the multiplier dedicated for integer multiplication with a shift circuit which performs different shift functions depending on instructions. Because sophisticated functions can be realized with a smaller quantity of hardware, an increase in the chip area can be prevented. Further, the execution of the CPU instruction, such as shift operation, after the multiplication is not required.

<<Connection between DSP and Data Bus>>

Figure 4:
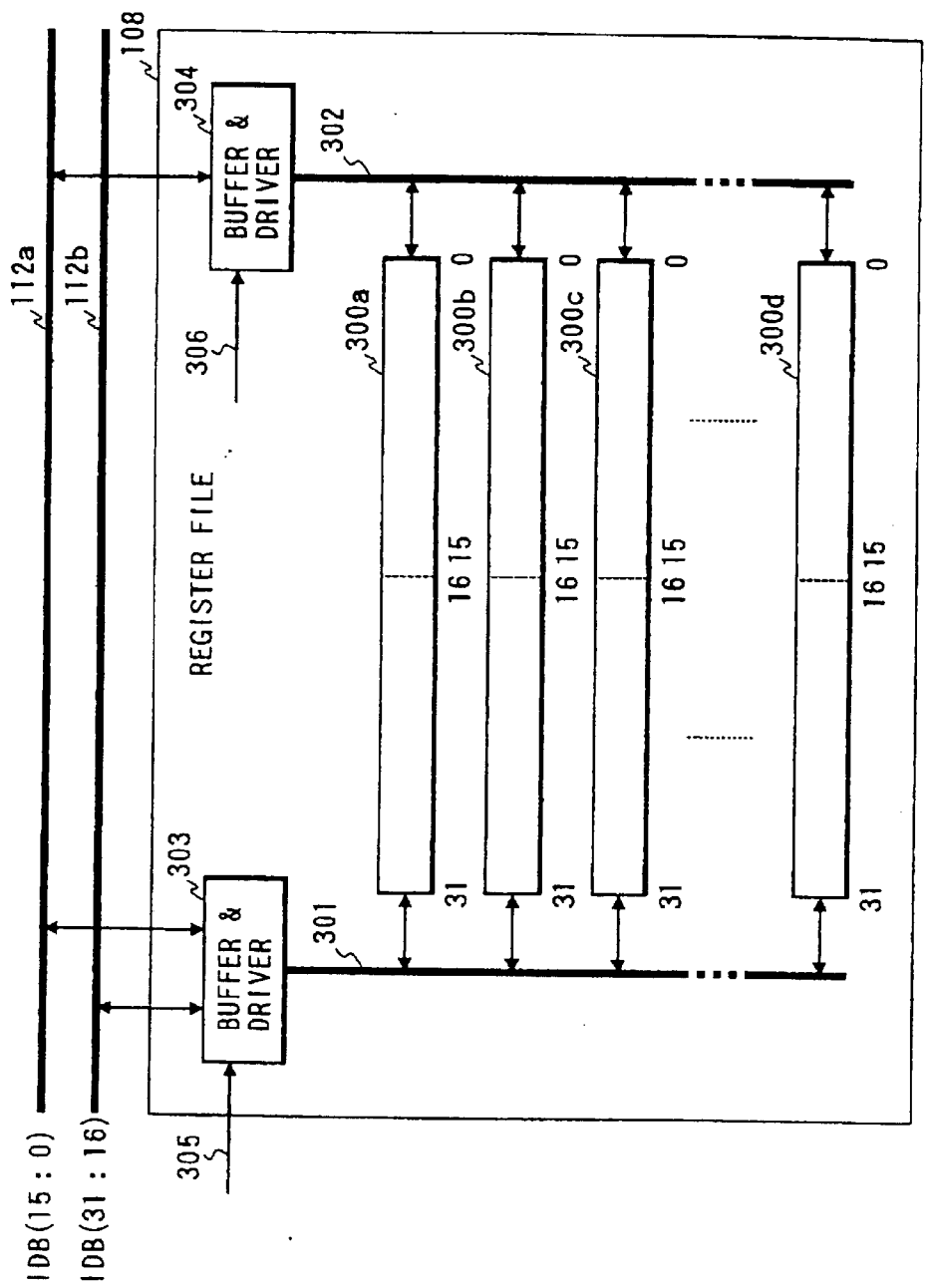
FIG. 4 is a block diagram showing the detail of a register file 108 and an example of its connection with the data bus in the digital signal processing unit 104 of the first embodiment of this invention.

FIG. 4 is a detailed block diagram of the register file 108 showing an example connection with a data bus. Because our explanation here focuses on essential points, this figure shows the configuration of only those parts related to the connection between the data bus 112 and the register file 108 and omits the connection with other data buses and calculators.

Figure 5:
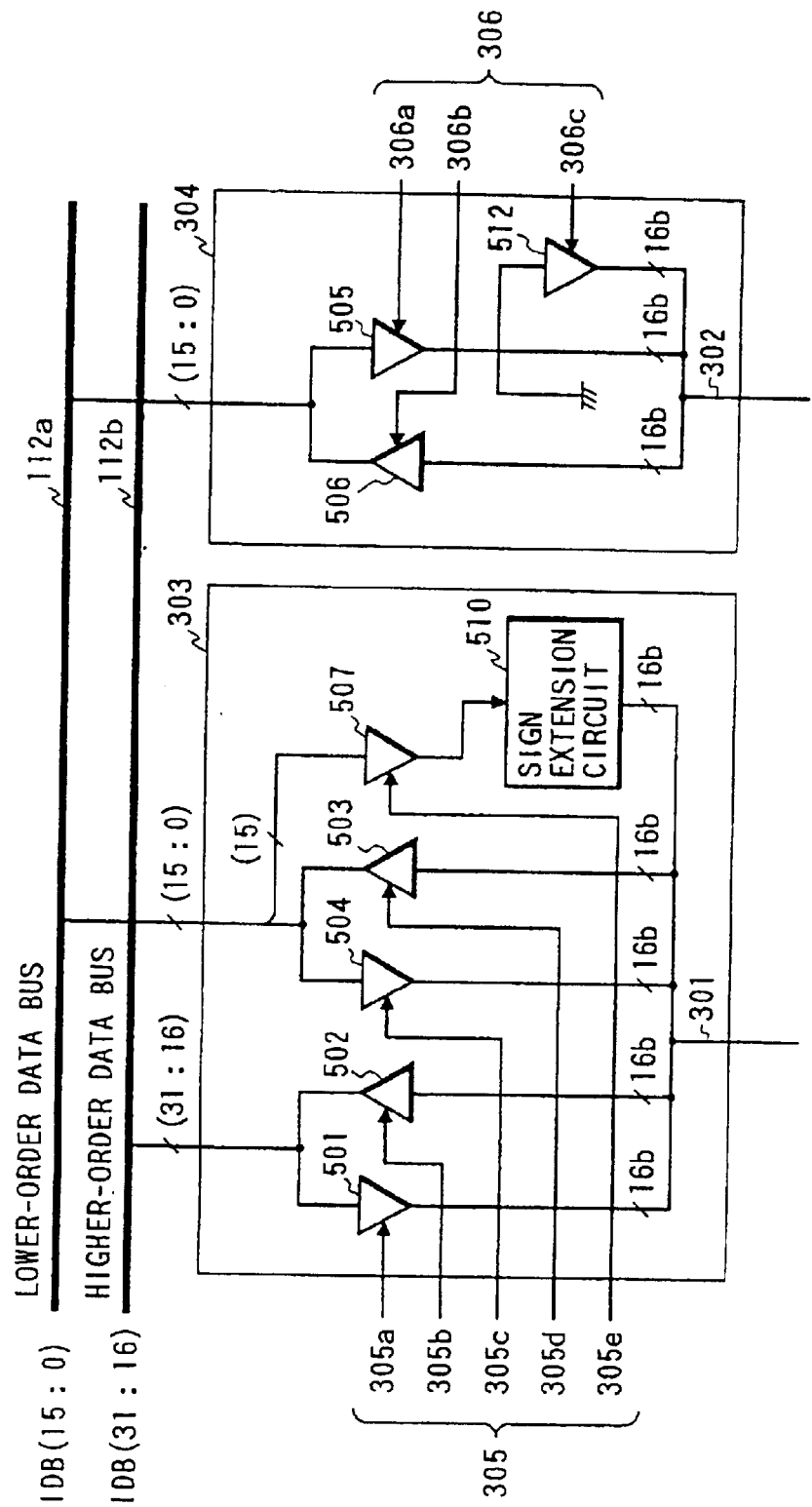
FIG. 5 is a circuit diagram showing the buffer and driver circuit.
Figure 7:
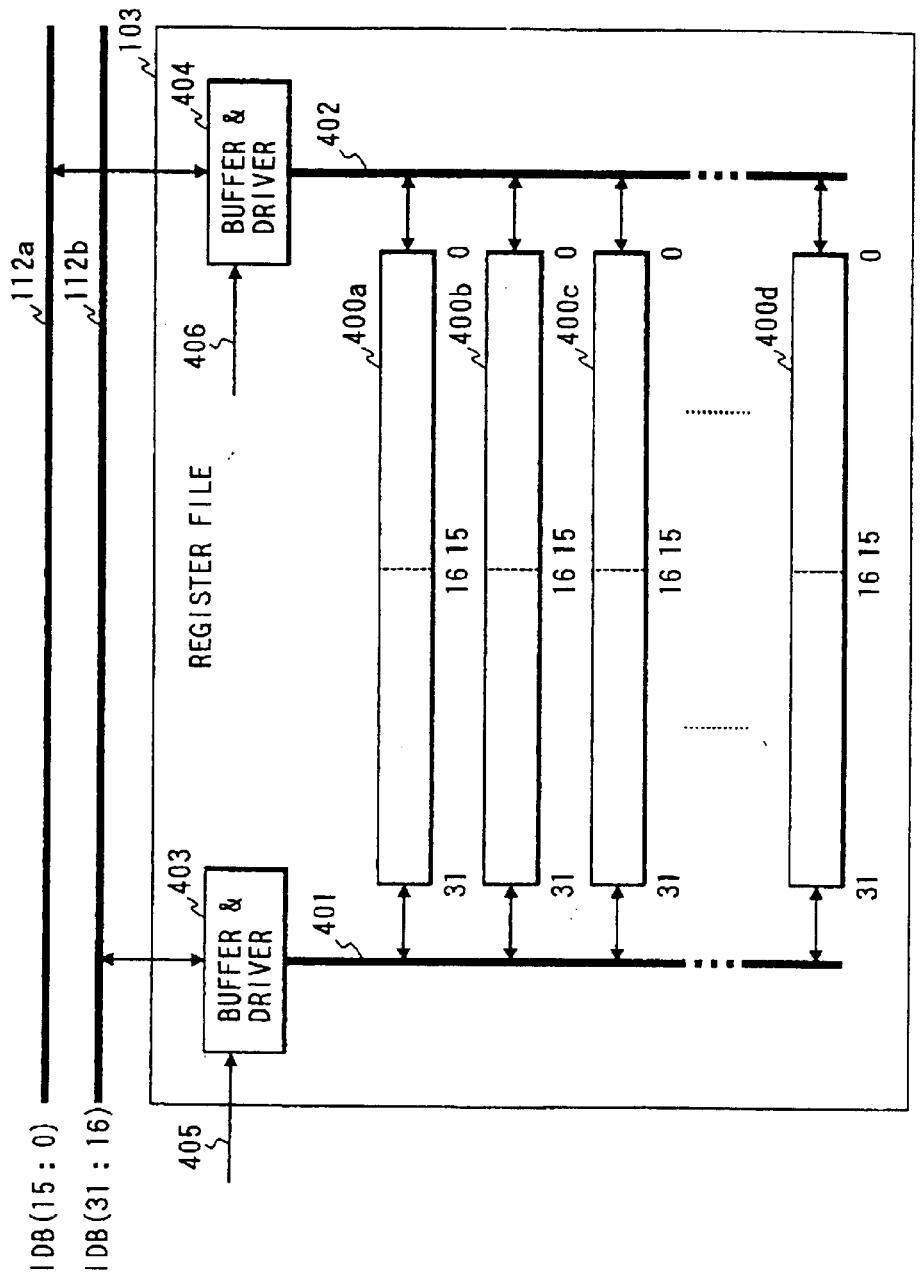
FIG. 7 is a block diagram showing the detail of a register file 103 and an example of its connection with the data bus in the central processing unit 101 of another embodiment of this invention.

In the figure, denoted 300a, 300b, 300c, 300d are individual registers; 301 a local bus connecting the higher-order words (from 16th bit to 31st bit) of the individual registers and a buffer and driver 303; 302 a local bus connecting the lower-order words (from 0th bit to 15th bit) of the individual registers and a buffer and driver 304; 303 a buffer and driver that relays data transfer between the higher-order words of the registers and the data bus 112; 304 a buffer and driver that relays data transfer between the lower-order words of the registers and the data bus 112; 305 a signal that controls the data transfer direction by selecting which of the higher-order word and the lower-order word of the data bus 112 the buffer and driver 303 shall be connected to; and 306 a signal that controls the data transfer direction by connecting the buffer and driver 304 to the lower-order word of the data bus 112. FIG. 4, 5 and 7 show the data bus 112 to be divided into a lower-order data bus 112a and a higher-order data bus 112b for the sake of explanation. FIG. 5 shows buffer and driver circuits 303, 304. FIG. 6 shows the relation between the control signal 305 (305a, 305b, 305c, 305d, 305e) for the buffer and driver 303, the control signal 306 (306a, 306b, 306c) for the buffer and driver 304, and data to be handled.

For simplicity, 16-bit data is called word data and 32-bit data is called long word data.

(1) Input/Output of Long Word Data

When long word data is input through the data bus 112 (in FIG. 6, this is represented as "loading long word"), the operation performed does not depend on whether the data is integer data or fixed-point data. That is, when the control signal 306a is held high ("1"), the input buffer 505 is enabled to electrically connect the lower-order data bus 112a and the local bus 302. As a result, data on the lower-order data bus 112a is stored in the lower-order word of the specified destination register (one of 300a to 300d) through the buffer and driver 304 and the local bus 302. At the same time, when the control signal 305a is held high ("1"), the input buffer 501 is enabled to electrically connect the higher-order data bus 112b and the local bus 301. As a result, data on the higher-order data bus 112b is stored in the higher-order word of the specified destination register (the same register in which the lower-order word was stored) through the buffer and driver 303 and the local bus 301.

When long word data is output on the data bus 112 (in FIG. 6, this is represented as "storing long word"), the operation performed in this case, too, does not depend on whether the data is integer data or fixed-point data. That is, when the control signal 306b is held high ("1"), the output buffer 506 is enabled to electrically connect the local data bus 302 and the low-order data bus 112a. As a result, word data output from the lower-order word of the specified source register (one of 300a to 300d) is transferred to the low-order data bus 112a via the local bus 302 and the buffer and driver 304. At the same time, when the control signal 305b is held high (p1p), the output buffer 502 is enabled to electrically connect the local data bus 301 and the high-order data bus 112b. Word data output from the higher-order word of the specified source register (the same register from which the lower-order word was output) is transferred to the higher-order data bus 112b via the local bus 301 and the buffer and driver 303.

(2) Input/Output of Word Data

The transfer of word data is performed using the lower-order data bus 112a at all times. The internal operation performed in the register file 108, however, changes depending on the kind of data.

(i) Integer Data

First, let us explain about the input/output operation when handling integer data. The operation when word data is input via the data bus 112 (in FIG. 6, this is described as "loading integer data word") is as follows. When the control signal 306a is held high ("1"), the input buffer 505 is enabled to electrically connect the lower-order data bus 112a and the local bus 302. Data on the lower-order data bus 112a is stored in the lower-order word of the specified destination register (one of 300a to 300d) via the buffer and driver 304 and the local bus 302. At the same time, when the control signal 305e is held high ("1"), the input buffer 507 is enabled to electrically connect the 15th bit of the lower-order data bus 112a and the local bus 301 through a sign extension circuit 510. Hence, the buffer and driver 303 takes in only the 15th bit data of the lower-order data bus 112a, copies and expands it to 16 bits, and stores it in the higher-order word of the specified destination register (the same register in which the lower-order word was stored) via the local bus 301. As a result, the signed data of the transferred word data is copied to the higher-order word of the destination register.

When the word data is output to the data bus 112 (in FIG. 6, this is described as "storing integer data word"), the operation is as follows. When the control signal 306b is held high ("1"), the output buffer 506 is enabled to electrically connect the local data bus 302 and the lower-order data bus 112a. Hence, word data output from the lower-order word of the specified source register (one of 300a to 300d) is transferred onto the lower-order data bus 112a via the local bus 302 and the buffer and driver 304. At this time, the buffer and driver 303 performs no operation at all. That is, the control signals 305a, 305b, 305c, 305d, 305e are all "0" (at low level), disabling the input buffers 501, 504, 507 and the output buffers 502, 503.

(ii) Fixed-Point Data

Next, the input/output operation for fixed-point data is explained. The operation when word data is input via the data bus 112 is as follows (in FIG. 6, this is described as "loading fixed-point data word"). When the control signal 305c is held high ("1"), the input buffer 503 is enabled to electrically connect the lower-order data bus 112a and the local bus 301. Hence, data on the lower-order data bus 112a is stored in the higher-order word of the specified destination register (one of 300a to 300d) via the buffer and driver 303 and the local bus 301. At the same time, when the control signal 306c is held high ("1"), the all-zero circuit 512 of the buffer and driver 304 generates 16-bit all-zero data and stores it in the lower-order word of the specified destination register (the same register in which the higher-order word was stored) via the local bus 301. As a result, the lower-order word of the destination register is automatically cleared. Instead of generating all-zero by the buffer and driver 304, the lower-order word may be cleared by a circuit that directly clears the destination register.

The operation when word data is output onto the data bus 112 is as follows (in FIG. 6, this is described as "storing fixed-point data word"). When the control signal 305d is held high ("1"), the output buffer 503 is enabled to electrically connect the local data bus 301 and the lower-order data bus 112a. Hence, word data output from the higher-order word of the specified source register (one of 300a to 300d) is transferred to the lower-order data bus 112a via the local bus 301 and the buffer and driver 303. At this time, the buffer and driver 304 does not perform any operation. That is, the control signals 306a, 306b, 306c are all zero (at low level) and the input buffer 505 and output buffer 506 and all-zero circuit 512 are disabled.

According to whether the instruction is an integer data transfer instruction or a fixed-point data transfer instruction, the statuses of the control signals 305 (305a, 305b, 305c, 305d, 305e), 306 (306a, 306b, 306c) are changed to control the buffer and driver circuits 303, 304 to make transfers from the higher-order word to the higher-order word, from the higher-order word to the lower-order word, or from the lower-order word to the higher-order word. This eliminates the need to execute a CPU instruction to perform such operations as shifting source data to the lower-order word side before executing the fixed-point multiplication operation, thus shortening the calculation time.

<<Connection between CPU and Data Bus>>

A detailed block diagram of the register file 103 in the central processing unit 100 and its example connection with the data bus are shown in FIG. 7. This figure, too, shows the configuration of only those portions related to connection with the data bus 112 and the register file 103 and omits the connection with other data buses and calculators. FIG. 7, as with FIG. 4, shows the data bus 112 to be divided into a lower-order data bus 112a and an higher-order data bus 112b. In the figure, reference numerals 400a, 400b, 400c, 400d represent individual registers; 401 a local bus connecting the higher-order words (from 16th bit to 31st bit) of the registers and the buffer and driver 403; 402 a local bus connecting the lower-order words (from 0th to 15th bit) of the registers and the buffer and driver 404; 403 a buffer and driver that relays transfer between the higher-order words of the registers and the higher-order data bus 112b; 404 a buffer and driver that relays transfer between the lower-order words of the registers and the lower-order data bus 112a; 405 a control signal to connect the buffer and driver 403 to the higher-order data bus 112b to control the data transfer direction; and 406 a control signal to connect the buffer and driver 404 to the lower-order data bus 112a to control he data transfer direction.

This register file 103 handles all data as integer data. Therefore, the data transfer operation is basically the same as the operation performed on integer data in the register file 108 of the digital signal processing unit 104, though there may be some difference in the operation, timing or pipeline operation. That is, the buffer and driver 403 includes circuits corresponding to the input buffers 501, 507, output buffer 502 and sign extension circuit 510 of the buffer and driver 303. The buffer and driver 404 includes circuits corresponding to the input buffer 505 and output buffer 506 of the buffer and driver 304. Therefore, the control signal 405 includes signals corresponding to the control signals 305a, 305b, 305e, and the control signal 406 includes signals corresponding to the control signals 306a, 306b.

The present invention has been described in detail in connection with the preferred embodiments. It is noted that this invention is not limited to these embodiments but that various modifications may be made without departing from the spirit of the invention. For example, this invention can be applied not only to microcomputers but also to digital signal processors.

Although the above embodiment concerns a case where both the integer data and fixed-point data transfer instructions are supported also in the register file 108, this invention does not necessarily require the integer data transfer instruction to be supported in the digital signal processing unit 104 but only requires supporting at least the fixed-point data transfer instruction. It is needless to say that the data bit length may be other than 16-bit or 32-bit long. Further, this embodiment has been described under the assumption that during the transfer of word data, only the lower-order word of the data bus is used. If a fixed-point word data is to be transferred, the similar function to this embodiment can be realized by using the higher-order word of the data bus and switching the word to be connected according to the kind of data by the receiving side. In this case, the buffer and driver 303 needs to be connected to the higher-order word side at all times and is not required to be connected to the lower-order data bus 112a. Further, although this embodiment assumes that because the fixed-point is positioned between the 30th bit and 31st bit, the range of values that can be represented is −1.0 or greater and less than +1.0, it is possible to use a register that supports an additional overflow prevention bit, generally called a guard bit. In this case, when the word data transfer instruction is executed, the word data in the range from 16th bit to 31st bit is transferred and the guard bit portion is sign-extended during data input and need only be ignored when the data is output.

Representative advantages of the present invention may be briefly summarized as follows.

In the microcomputers and digital signal processors—which have mounted on a single chip a central processing unit for controlling the entire system and a digital signal processing unit having a product sum function required to process digital signals efficientlypthe digital signal processing unit is capable of handling fixed-point data and therefore can perform more complicated digital signal processing.

In the data transfer operation between the digital signal processing unit and memory or external circuits, when data whose bit length is shorter than the calculation precision, the unit is provided with a function of inputting and outputting data to and from the higher-order side of the register and a data transfer instruction for fixed-point data is provided separately from the conventional integer data-dedicated transfer instruction. This arrangement makes it possible to eliminate redundant shift operations that would otherwise be required by data transfer, thus improving operation speed.

Because the digital signal processing unit is provided with an instruction for executing fixed-point data calculation in addition to the conventional integer data calculation instruction, the bit position of the result of multiplication is automatically corrected, contributing to higher operation speed.

What is claimed is:

1. A data processing device comprising:

a first processing unit having an integer calculation function;

a second processing unit controlled by the first processing unit having a fixed-point data calculation function;

wherein the second processing unit includes a register and a multiplier which is to perform an integer data calculation and a fixed-point data calculation;

wherein the first processing unit performs a first type instruction, and the second processing unit performs a second type instruction, the second type instruction having a first instruction for calculating an integer data and a second instruction for calculating a fixed-point data;

wherein the first processing unit decodes the first type instruction and the second type instruction, wherein the first processing unit outputs a control signal corresponding to a decoded result to the second processing unit when the first processing unit decodes the second instruction, wherein when the first processing unit decodes the first type instruction, the first processing unit operates, wherein when the first processing unit decodes the first instruction of the second type instruction, the multiplier in the second processing unit calculates an integer data, wherein when the first processing unit decodes the second instruction of the second type instruction, the multiplier in the second processing unit calculates a fix-point data, wherein when a second instruction is executed to transfer data, whose bit length is shorter than the bit length of the register, from the register to the outside of the second processing unit, the second processing unit outputs a required bit length of the data from the higher-order side of the register to the outside.

2. A data processing device according to claim 1, wherein the multiplier has a shifter, wherein when the first processing unit decodes the first instruction of the second type instruction, the shifter outputs the output of the multiplier without shifting it, wherein when the first processing unit decodes the second instruction of the second type instruction, the shifter outputs the output of the multiplier with shifting it.

3. A data processing device according to claim 2, wherein the first processing unit decodes the second instruction of the second type instruction, the shifter shifts left the output of the multiplier by one bit and inputs zero to the least significant bit.

4. A data processing device according to claim 1, wherein the first and second processing units are formed on a single semiconductor substrate.

5. A data processing device according to claim 1, further comprising:

a first memory;

a second memory;

a first data bus coupled with the first processing unit, the second processing unit, the first memory and the second memory;

a second data bus coupled with the second processing unit and the first memory; and a third data bus coupled with the second processing unit and the second memory.

6. A data processing device according to claim 1, further comprising:

a first memory; and a second memory, wherein the second processing unit reads data from the first memory and the second memory in parallel.

* * * * *